US007693869B2

(12) United States Patent
Hutson et al.

(10) Patent No.: US 7,693,869 B2
(45) Date of Patent: Apr. 6, 2010

(54) METHOD AND APPARATUS FOR USING ITEM DWELL TIME TO MANAGE A SET OF ITEMS

(75) Inventors: William Edward Hutson, Cary, NC (US); David Bruce Lection, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 11/470,484

(22) Filed: Sep. 6, 2006

(65) Prior Publication Data

US 2008/0059521 A1 Mar. 6, 2008

(51) Int. Cl.
*H04H 60/31* (2008.01)
*H04N 5/50* (2006.01)
*G06F 17/00* (2006.01)

(52) U.S. Cl. .................. 707/104.1; 725/9; 725/38; 348/E5.001; 348/E5.096

(58) Field of Classification Search .............. 707/104.1; 725/9, 38; 348/E5.001, E5.096
See application file for complete search history.

(56) References Cited

U.S. PATENT DOCUMENTS

| | | | |
|---|---|---|---|
| 5,995,101 A | | 11/1999 | Clark et al. |
| 6,005,570 A | | 12/1999 | Gayraud et al. |
| 6,721,953 B1 * | | 4/2004 | Bates et al. ............. 725/39 |
| 7,509,662 B2 * | | 3/2009 | Kamen ............. 725/9 |
| 2002/0010626 A1 | | 1/2002 | Agmoni |
| 2002/0111865 A1 | | 8/2002 | Middleton, III et al. |
| 2002/0123928 A1 * | | 9/2002 | Eldering et al. ............. 705/14 |
| 2002/0175953 A1 * | | 11/2002 | Lin ............. 345/811 |
| 2003/0012554 A1 * | | 1/2003 | Zeidler et al. ............. 386/83 |
| 2003/0115589 A1 * | | 6/2003 | D'Souza et al. ............. 725/10 |
| 2004/0133906 A1 * | | 7/2004 | Przybylek ............. 725/9 |
| 2004/0267600 A1 | | 12/2004 | Horvitz |
| 2005/0080770 A1 | | 4/2005 | Lueder et al. |
| 2005/0102274 A1 | | 5/2005 | Chen |
| 2005/0102282 A1 | | 5/2005 | Linden |
| 2005/0136871 A1 * | | 6/2005 | Patel ............. 455/222 |
| 2008/0259220 A1 * | | 10/2008 | Stahulak et al. ............. 348/734 |

OTHER PUBLICATIONS

Wikipedia, Standard deviation, Aug. 14, 2005.*

* cited by examiner

*Primary Examiner*—James Trujillo
*Assistant Examiner*—William Spieler
(74) *Attorney, Agent, or Firm*—Jordan Law LLC

(57) ABSTRACT

A computer implemented method, apparatus, and computer usable program code for managing a serially presented set of items. The process displays a content for a given item for an amount of time based on user input in response to a user selection of the given item. The process identifies a dwell value for the given item based on a dwell time for the given item and a timing profile. The dwell time is the amount of time the content for the given item is displayed. The process removes the item from a plurality of content items in response to a determination that the dwell value for the item is less than a dwell threshold.

18 Claims, 13 Drawing Sheets

METHOD AND APPARATUS FOR USING ITEM DWELL TIME TO MANAGE A SET OF ITEMS

BACKGROUND OF THE INVENTION

1. Field of the Invention

The present invention is related generally to a data processing system and in particular to a method and apparatus for managing a set of items. More particularly, the present invention is directed to a computer implemented method, apparatus, and computer usable program code for using item dwell time to automatically manage a set of serially presented items.

2. Description of the Related Art

Frequently, a user wants to select one or more items of interest from a long list of serially presented choices. For example, a user may want to select one television channel for viewing from a set of available television channels. To determine which items in the set of items are of interest, the user must generally review the content for every item in the entire set of items to find items of interest. The user must then attempt to remember which items in the set were of the most interest. For example, if a user wants to watch television but does not have a specific program the user wants to watch and/or the user does not know the channel on which a desired program or content will be shown, the user must view every channel in the entire set of available television channels to determine which channel(s) are playing a desired program.

If the set of available channels includes a large number of channels, such as is common with cable television or satellite television, the list of channel options will typically exceed a human memory capability for easily recalling/comparing the available choices. Moreover, if one or more channels are playing commercials or other non-programming content, a user may have to go through the set of channels more than once to determine the user's interest in the current program content for each channel. In addition, a human user may be unable to recall which channels were showing commercials, which channels were showing program content of interest, and which channels were showing program content of no interest to the user when the user went through the set of available channels.

Thus, selecting an item of interest from a large set of serially presented choices by reviewing every item in the set of items and attempting to remember which items are of interest to the user is difficult for a human memory. Moreover, reviewing the entire set of serially presented choices through multiple presentations of the entire set of items in order to determine which item in the set is of the greatest interest to the user can be inconvenient and prohibitively time consuming where the set of items includes a large number of items.

BRIEF SUMMARY OF THE INVENTION

The illustrative embodiments provide a computer implemented method, apparatus, and computer usable program code for managing a serially presented set of items. In response to a user selection of the given item, the process displays a content for the given item for an amount of time based on user input. The process identifies a dwell value for the given item based on a dwell time for the given item and a timing profile. The dwell time is the amount of time the content for the given item is displayed. The process removes the item from a plurality of content items in response to a determination that the dwell value for the item is less than a dwell threshold.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
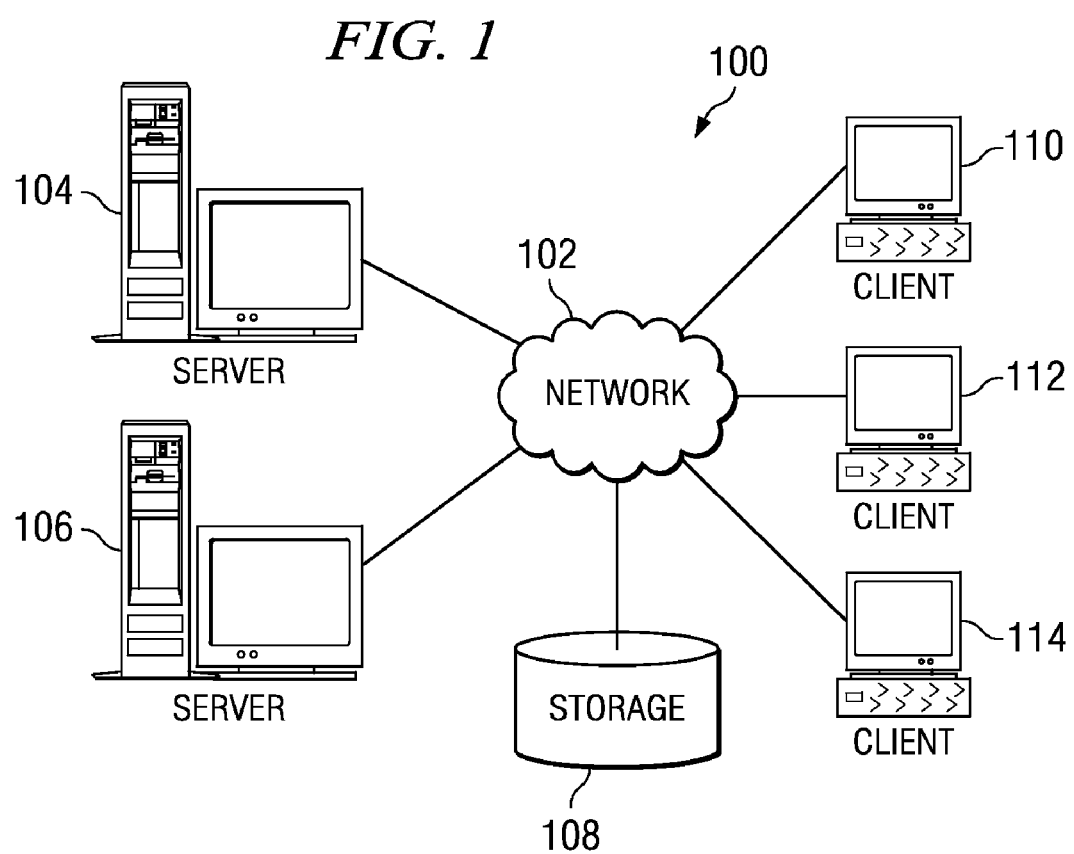
FIG. 1 is a pictorial representation of a network of data processing systems in which illustrative embodiments may be implemented.
Figure 2:
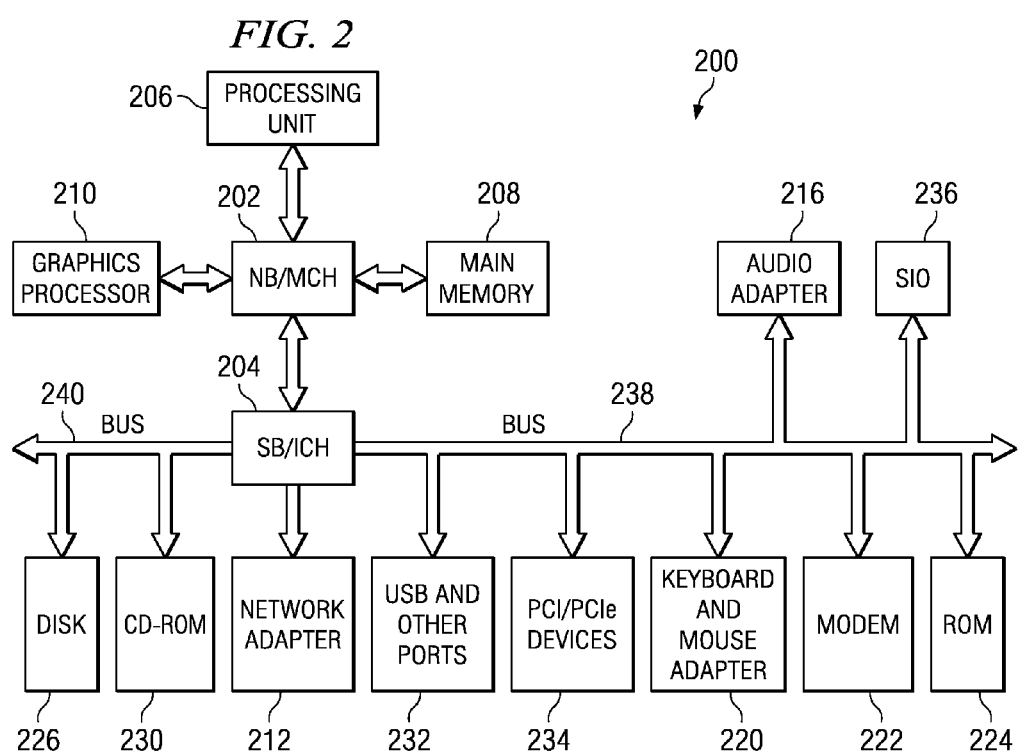
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In this example, server 104 and 106, and clients 110, 112, and 114 are computing devices. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, a telephone device, or a personal media player, such as an ipod®, in addition to taking the form of a PDA.

Frequently, a user wants to select one or more items of interest from a long list of serially presented choices, such as a set of available television channels or Internet web pages. The presentation of the list of serially presented choices to a user could be a visual presentation, as well as an auditory presentation, such as visual and/or sound content provided by a television, radio, computer, laptop, personal digital assistant (PDA), cellular telephone, camera phone, camcorder, personal media player, speakers, headphones, or any other known or available means for presenting visual and auditory content to a user.

Currently, if a user wants to select an item of interest from a large set of content choices, the user must generally view every item in the entire set of items and attempt to remember which items in the set were of the most interest. For example, if a user wants to choose a television program to watch by surfing through all the channels, the user must attempt to remember which channels were showing programming of interest to the user and which channels were not showing program of interest in order to narrow the set of channel choices down to one or two selected channels for viewing.

If a large number of channels are available, attempting to remember which items are of interest to the user can be difficult for the human memory. Moreover, reviewing the entire set of serially presented choices through multiple presentations of the entire set of items in order to determine which item in the set is of the greatest interest to the user can be confusing, inconvenient, and prohibitively time consuming for users.

The illustrative embodiments recognize the need to automatically reduce the number of content items in a large set of content item choices, such as television channels or music in a playlist, in order to provide a more workable or manageable set of choices for a user. Therefore, the illustrative embodiments provide a computer implemented method, apparatus, and computer usable program code for using an item dwell time to automatically select and deselect items from a large set of serially presented content item choices.

As used herein, a content item includes a television channel selection, a radio station, music in a playlist on a media player, a web site or web page, an entry in a toolbar menu, a graphical icon on a desktop, a cell phone menu choice, a menu choice on any computing device, and any other selectable item in a serially presented list of choices.

As used herein, a television channel includes terrestrial television channels, such as very high frequency (VHF) television channels and ultra high frequency (UHF) television channels, cable television channels, satellite television channels, Internet television (Internet TV), and any other types of television broadcasts known or available to one who is skilled in the art.

As used herein, a radio station includes amplitude modulation (AM) radio stations, frequency modulation (FM) radio stations, no modulation (XM) satellite radio stations, Internet radio, and any other known or available types of radio.

In accordance with the illustrative embodiments, dwell time is an amount of time that a user dwells on an item. In other words, dwell time is the amount of time that a user selects to display the content of an item before selecting to display the next item in the set of content items. A user selects an amount of time for displaying an item by selecting to end the display of the item or selecting to display a next item in the set of items. For example, a user selects or controls the amount of time a particular television channel displays by selecting a channel for display and then selecting to display a next channel in the set of channels, turning off the television, or otherwise selecting to end the display of the given channel. In this example, the amount of time that the channel is displayed is the interval of time between the user's selection to display the given channel and the user's selection to display a next or different channel in the set of channels.

The amount of time that a user displays the content of a given item is the dwell time. The dwell time is an indirect and graded measure of human interest in a content choice. Dwell time is an indicator of human interest due to the natural human response of dwelling more on items of interest than on items that are not of interest.

Thus, the illustrative embodiments provide a computer implemented method, apparatus, and computer program product for managing a set of serially presented content items. The process displays a content of a given item from a plurality of content items to a user for an amount of time.

The process measures an amount of time that the user selects to display the content of the given item to form a dwell time for the given item. In other words, the process displays a content for a given item for an amount of time based on user input in response to a user selection of the given item. The user controls the amount of time the item displays by selecting a next item for display or by selecting to end display of the items in the set of items. In other words, a user can close out the dwell time sampling period for a given item by requesting a new choice or next item in the set of items for display.

The process identifies a dwell value for the given item based on a dwell time for the given item and a timing profile for the given item. The dwell time is the amount of time the content for the given item is displayed. The timing profile for each item specifies a timing sensitivity for each item and/or a timing offset.

The process removes the item from a plurality of content items in response to a determination that the dwell value for the item is less than a dwell threshold. The given item is removed from the plurality of content items to form a selected set of items. The selected set of items contains the items that have a dwell value greater than the dwell threshold.

As used herein, the term display refers to displaying visual or video content, as well as playing or presenting audio content in conjunction with the video content and/or in the absence of video or visual content. Thus, the term "displaying a content for a given item" can refer to displaying a visual content, such as television programs and graphic content and/or or playing audio content, such as music or radio programs.

Figure 3:
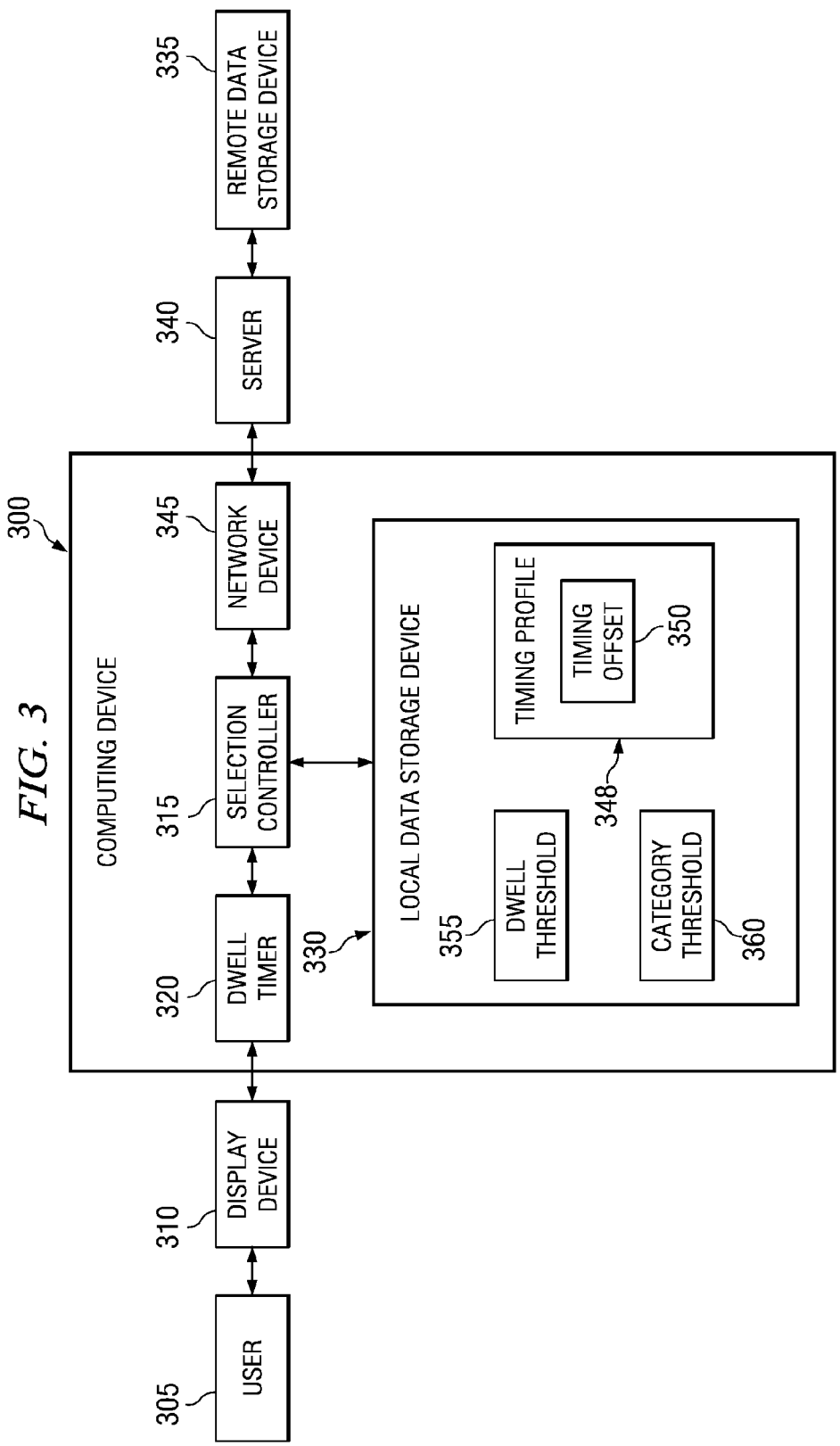
FIG. 3 is a block diagram illustrating a dataflow when a dwell time is used to manage a set of content items in accordance with an illustrative embodiment.

Turning now to FIG. 3, a block diagram illustrating a dataflow when a dwell time is used to manage a set of content items is shown in accordance with an illustrative embodiment. Computing device 300 is any type of computing device, such as a server, a personal computer, laptop computer, tablet PC, a personal digital assistant (PDA), a cellular telephone, a personal media player, a smart watch, or any other computing device, including but not limited to, the computing devices depicted in FIGS. 1 and 2.

User 305 views, listens to, and/or attends each item in a set of serially presented items at display device 310. In this illustrative example, the set of serially presented items is a menu of television channels. User 305 views each channel in the menu of channels at display device 310. However, the set of serially presented items can also include a set of Internet web sites, radio stations, cell phone menu choices, a set of graphical icons, and any other set of listing of two or more choices for display.

Display device 310 is a device for displaying visual and/or auditory content. Display device 310 can include a television, a computer, a monitor, a radio, a personal media player, a set of speakers, headphones, and/or any other device for displaying or presenting visual or auditory content to a user. A television includes direct TV or cathode ray tube (CRT), liquid crystal display (LCD), plasma display panels, digital light processing (DLP) or any other known or available device for displaying television content. In this illustrative example, display device 310 is a television.

Display device 310 displays the content of a given item from the initial set of content items for an amount of time. Content of a given item is the content that is being presented, played, or displayed to user 305. In this example, content of the given item is television programming content, such as the five o'clock news. A user selects the amount of time the content of the given item displays by selecting a different item in the initial set of content items. In this example, user 305 controls the amount of time the content of a given television channel is displayed by changing the television to the next channel in the menu of available television channel choices. In this example, the content for each item in the initial set of content items is displayed at display device 310 in a sequence.

User 305 is responsible for performing one or more explicit or subtle acts to view or dwell on a current content item for a user-selected or user controlled amount of time and then move to the next item. For example, if the content item is a television channel, the user can explicitly press a button on a display device, press a button on a remote control, manipulate a mouse or keyboard on a computer, press a touch screen, or verbally indicate a desire to begin display of an item and/or end display of an item by means of a voice response system.

User 305 may also use a more subtle act to control display or presentation of each item. For example, a display device or display controller could monitor a user's eye movement, direction of a user's gaze, eye blinking, movements of facial muscles, movement of a user's head, such as nodding the head, or any other body movement used to control the display of an item to the user. A user's eye movement and/or any other body movements can be monitored by a video camera and interpreted by a computer having software for recognizing a user's eye movements, facial movements, and/or any other body movements chosen to control dwell time and indicate selection of a next item in the list of serially presented items for display.

Selection controller 315 is a software component for managing an initial set of content items. Selection controller 315 uses dwell time as an indirect measure of human interest in each item in the set of items. Dwell time is the amount of time that a user selects to display the content of a given item in the initial set of content items. A user will tend to dwell longer on item content that is of interest to a user. Thus, the longer user 305 dwells on or selects to display a given item, the greater the interest user 305 has in the item relative to the other items in the initial set of content items.

Dwell timer 320 is a software component and/or a hardware timer component that measures the amount of time that user 305 selects to display the content of a given item. The amount of time user 305 selects to display the content of the given item is the dwell time for the given item. Dwell timer 320 monitors the dwell time that a human user spends on each item. Dwell timer 320 includes a counter for measuring the amount of time that a given item is displayed to user 305. Dwell timer 320 starts the counter when a given item is first displayed on display device 310. Dwell timer 320 stops the counter when user 305 selects to display a next item in the initial set of content items. In this example, no additional task beyond requesting a next item for display is necessary by the user to close out the dwell time sampling period.

The dwell time, which is the total amount of time the item was displayed, is sent to selection controller 315. Selection controller 315 stores the dwell time for the given item in local data storage device 330. The dwell time can be a continuous, uninterrupted period of time. In addition, the dwell time for an item can be a cumulative dwell time. A cumulative dwell time is obtained by adding two or more discontinuous time periods during which a given item was displayed.

After sending the dwell time to selection controller 315, dwell timer 320 resets a timing counter. When the next item in the initial set of content items is displayed at display device 310, dwell timer 320 restarts the timing counter to measure the dwell time for the next item. In this manner, dwell timer 320 measures a dwell time for every item in the plurality of content items that is displayed to user 305. The dwell time for each item is stored in a data storage device as a set of dwell values, such as local data storage device 330 and/or remote data storage device 335.

Local data storage device 330 is a device for storing data, such as storage 108 in FIG. 1, as well as ROM 224, CD-ROM 230, and Disk 226 in FIG. 2.

Selection controller 315 can also store the dwell time for a given item in remote data storage device 335. Remote data storage device 335 is any type of device for storing data that is not located on computing device 300. In this illustrative example, remote data storage device 335 is located on server 340. Server 340 is any type of server, such as server 104 and 106 in FIG. 1. Server 340 can be a server on a network, such as network 102 described in FIG. 1. Computing device 300 accesses remote data storage device 335 on server 340 through a network connection via network device 345.

Network device 345 is any type of known or available network access hardware and/or software for allowing computing device 300 to access a network. Network device 345 connects to a network connection, such as network 102 in FIG. 1. The network connection permits access to any type of network, such as a local area network (LAN), a wide area network (WAN), or the Internet.

Selection controller 315 calculates a dwell value for the given item based on the dwell time and timing profile 348. The dwell value for the given item is the dwell time adjusted to take into account constants or constraining factors influencing a user's dwell time. Selection controller uses a timing profile for the given item in the calculation of the dwell value for the given item, such as timing profile 348.

Timing profile 348 allows selection controller 315 to calculate the dwell area based on unique factors associated with each given item in the initial set of content items. Timing profile 348 provides information regarding a timing sensitivity for a given item. The timing sensitivity includes timing constraints and timing constants for the given item. For example, timing profile 348 includes a timing offset 350.

Timing offset 350 is a set of data regarding a given item. Timing offset 350 can include an amount of time required to render the content for a given item. In other words, when a content is displayed, such as a web page, a certain amount of time is required to render the web page on a computer display. This render time is not time that user 305 dwells on the item content. However, render time is included in the dwell time for the given item. Therefore, selection controller 315 uses timing offset 350 data to calculate the dwell value for the given item to take into account the time required to render the content for the given item.

Timing offset 350 can also include data regarding an amount of time for displaying non-programming content, such as advertising or commercials. As used herein, non-programming content includes any advertising or commercial content. For example, if a given item is a web page, a pop-up advertisement that is displayed during display of the web page is not part of the web page's regular content. If the given item is a television channel or a radio station, a commercial that is broadcast during a station break is also non-programming content. Thus, advertising and commercials are not part of the given item's regular content.

Timing profile 348 provides timing sensitivity data, such as timing offset 350, to selection control 315. Timing profile 348 permits user 305 to vary and adjust the sensitivity level of the dwell time measurements and dwell time value calculations. In other words, the timing sensitivity data in timing profile 348 can be adjusted and changed by user 305 to change the manner in which the dwell value for a given item is calculated. For example, timing profile 348 includes timing offset 350. User 305 can change timing offset 350 to take into account render time, commercial/advertising time, and any other factors affecting the dwell value for the given item.

Selection controller 315 calculates a dwell value for the given item based on the dwell time for the given time and the timing sensitivity data and/or timing offset 350 data retrieved from timing profile 348. In other words, selection controller 315 uses timing profile 348 to calculate the dwell value for the given item based on non-linear dwell timing. In this example, selection controller 315 calculates dwell value based not only on the actual dwell time that the item is displayed, but also based on rendering time, non-programming time, and any other data influencing the dwell time for a given item. In this example, selection controller 315 subtracts timing offset 350 from the dwell value to obtain the adjusted dwell value.

In this manner, selection controller 315 calculates a dwell value for every item in the initial set of content items that is displayed to user 305 based on the dwell time for each item and timing profile for each item. Selection controller 315 stores the dwell values for every item in the initial set of content items in a data storage device, such as local data storage device 330 and/or remote data storage device 335.

Selection controller 315 uses statistical measures of central tendency and dispersion, such as a mean dwell value and/or a standard deviation from the mean dwell value, to calculate a dwell threshold value. Selection controller 315 uses the set of dwell values for the initial set of content items to calculate a mean dwell value. A mean value is an average of a set of values, a statistical norm, an intermediate value, or an expected value. The mean is obtained by adding a set of values to get a total. The total is then divided by the number of values in the set to obtain the average or intermediate value represented by the set of values. For example, if a set of dwell values include the following values: 2 seconds, 4 seconds, and 6 seconds, the mean or average dwell value is 4 seconds.

Selection controller 315 also calculates a standard deviation from the mean dwell value. The standard deviation is a statistic used to measure the variance or dispersion of a distribution. In the example above, although the mean dwell value is 4 seconds, the actual dwell values varied from 2 seconds to 6 seconds. In such a case, the actual dwell values for the three dwell values deviated from the mean by 2 seconds when compared to the average dwell value of 4 seconds. Selection controller 315 stores the mean dwell value and the standard deviation for the mean dwell value in a data storage device, such as local data storage device 330 and/or remote data storage device 335.

In this example, selection controller 315 utilizes mean dwell value and a standard deviation. However, mean and standard deviation are just one of a set of common statistical measures that could be used to determine deviation from a threshold. Selection controller 315 could also use median values or middle scores and other measures of dispersion. Selection controller 315 stores the value calculated for dwell threshold 355 in a data storage device, such as data storage device 330 or 335.

Selection controller 315 retrieves dwell threshold 355 from the data storage device. Dwell threshold 355 is a threshold value used to determine whether a given item should be removed from the initial set of content items in order to create a subset or selected set of items.

In this example, the dwell threshold value is calculated by selection controller 315. However, the dwell threshold value can also be a user defined threshold value. User 305 can select the value for dwell threshold 355 to create a user defined dwell threshold. In another example, dwell threshold 355 can be a predefined default threshold value. In other words, a value for dwell threshold 355 is pre-selected or pre-programmed and user 305 is not required to select or enter a value for dwell threshold 355.

In this illustrative example, selection controller 315 dynamically calculates or selects a dwell threshold 355 value based on the mean dwell value and/or the standard deviation from the mean threshold value. For example, selection controller 315 can calculate dwell threshold 355 value equal to the standard deviation from the mean dwell value.

Selection controller 315 compares a dwell value for each item in the initial set of content items to dwell threshold 355. Selection controller 315 removes each item with a dwell value that is less than dwell threshold 355 from the initial set of content items to generate the new subset or selected set of items.

The selected set of items is smaller than the original initial set of content items. The selected set of items only contains items with dwell values greater than the threshold. Thus, these items are items determined to be of greater interest to user 305 relative to the items that were removed. Moreover, the selected set of items is easier for user 305 to review and make item selections because the selected set of items contains fewer items after selection controller 315 removes items having a lower dwell value than the value for dwell threshold 355.

Selection controller 315 determines whether the selected set of items includes more than one item. If more than one item is included in the selected set of items, selection controller 315 repeats the process of identifying a dwell value for each item based on a dwell time and a timing profile for each item, retrieving a dwell threshold, and removing any items with a dwell value less than the dwell threshold to further reduce the number of items in the selected set of items. This process is repeated until a single item is selected for user 305. In other words, selection controller 315 performs recursive passes through the selected set of items to continually decrease the set size of options by further removing items with less than average dwell values. The net result is that without any direct user selection, the set size of items decreases automatically and rapidly to yield a much more workable set size for user 305.

The interests of user 305 can change. Likewise, the content of an item can also change. Therefore, selection controller 315 can expand or add items to the selected set of items in response to changing item content and changing interests of user 305.

Selection controller 315 also determines if the selected set of items should be expanded by adding new content items to the selected set of items. Selection controller 315 determines if the selected set of items should be expanded based on whether a category expansion mode is selected and whether a continuous expansion mode is selected.

Selection controller 315 makes a determination as to whether a continuous expansion mode and a content expansion mode is selected based on setting a content expansion mode flag and setting a continuous expansion mode flag. Selection controller 315 sets the continuous expansion mode flag based on input from user 305.

A content expansion mode flag set to true indicates that a content expansion should be performed during a single iteration through the set of content items. A continuous expansion mode flag set to true indicates that a content expansion should be performed during every iteration through the set of content items.

Thus, if a content expansion mode flag is set to false and a continuous expansion mode flag is also set to false, no additional content items are added to the selected set of items. Likewise, if the content expansion mode is set to false and the continuous expansion mode is set to true, no additional content item expansion is attempted during any iteration through the set of content items.

If a content expansion mode flag is set to true and the continuous expansion mode flag is set to false, a content expansion is performed during the first iteration through the initial set of content items only. Likewise, if a content expansion mode flag is set to true and a continuous expansion mode flag is set to true, a content expansion is attempted on every iteration through the set of content items.

If the category expansion mode is selected, selection controller 315 retrieves a dwell value for a given item in the selected set of items. Selection controller 315 also retrieves category threshold 360 from a data storage device, such as local data storage device 330.

Category threshold 360 is a threshold value used to determine whether a given item should be removed from the initial set of content items. Category threshold 360 can be a user defined threshold value. In other words, user 305 can select the value for category threshold 360. In another example, category threshold 360 can be a predefined default threshold value. In other words, a value for category threshold 355 is pre-selected or pre-programmed. User 305 is not required to select or enter a value for a predefined default category threshold 360.

In this illustrative example, selection controller 315 dynamically calculates or selects a category threshold 360 value based on the mean dwell value and/or the standard deviation from the mean threshold value. In this example, selection controller 315 sets category threshold 360 value equal to the mean dwell value added to two times the standard deviation.

In the illustrative example shown in FIG. 3, category threshold 360 value is calculated as follows:

Threshold=Mean+(2* standard deviation)

However, a value for category threshold 360 can be calculated using any statistical measure and/or formulations for automatically calculating a category threshold value. In addition, a value for category threshold 360 can be a user defined value, as well as a predefined default value.

Selection controller 315 compares a dwell value for a given item in the selected set of items to category threshold 360. In response to determining that dwell value for a given item is greater than category threshold 360, selection controller 315 retrieves a category identifier for the given item. A category identifier identifies a category for the content associated with the given item. For example, if a given item is CNN® news channel, the category identifier for the item is news. Each item in the initial set of content items has an associated category identifier stored in a timing profile for the given item, such as timing profile 348.

Selection controller identifies all items in the initial set of content items having the same category identifier as the given item. Selection controller 315 adds the identified items from the initial set of content items to the selected set of items. In this manner, selection controller 315 can expand the selected set of items in response to changing interests of user 305, new content for items, and changing content for items.

In this example, items removed from the selected set of items are permanently removed, unless user 305 selects a category expansion mode. In another illustrative example, items removed from selected set of items are only removed temporarily. After a predetermined period of time, selection controller 315 automatically re-adds removed items to the selected set of items. For example, if the predetermined period of time is thirty (30) minutes, every thirty minutes, one or more removed items are re-added to the selected set of items. In this example, all the items removed from the selected set of items are restored to the selected set of items based on an elapsed amount of time. In other words, all removed items are automatically re-added to the selected set of items after a predetermined period of time has elapsed since the items were removed from the selected set of items. The predetermined period of time can be any time interval, such as thirty minutes, one hour, two hours, or any time interval selected by a user as a user defined time interval or pre-set as a default time interval.

In this illustrative example, timing profile 348 is unique to each given item in the set of items. In another illustrative embodiment, there is a single timing profile for all items in the initial set of content items.

Likewise, in the example shown in FIG. 3, selection controller 315 subtracts timing offset 350 from the dwell value to adjust the dwell value for rendering time and non-programming content. In another embodiment, dwell timer 320 pauses or stops measuring dwell time during rendering of content and/or display of non-programming content in accordance with timing sensitivity data provided by timing profile 348. For example, when a television or radio program goes to a commercial break, dwell timer 320 pauses a dwell time counter. When the commercial break is over and the regular program resumes, dwell timer 320 also resumes the dwell time counter. In such a case, if a user displays a given item for three minutes and commercials played for one minute and rendering required 2 seconds in total, dwell timer 320 will only record one minute and fifty-eight seconds of dwell time to form an adjusted dwell time. The adjusted dwell time is then used to calculate a dwell value for the item. In this case, a timing profile is not required to calculate the dwell value.

In this illustrative example, dwell threshold 355, timing profile 325, and category threshold 360 are stored on local data storage device 330. However, in accordance with the illustrative embodiments, dwell threshold 355, timing profile 325, and category threshold 360 can also be stored on remote data storage device 335.

In this illustrative example, display device 310 is depicted as a separate component from computing device 300. However, in accordance with another illustrative embodiment, display device 310 and computing device 300 are embodied within a single component.

Likewise, in this example, dwell timer 320 and selection controller 315 are depicted as separate components. However, in another embodiment, dwell timer 320 and selection controller 315 may be embodied within a single component.

In another example, user 305 has a personal profile available to selection controller 315. Personal profiles contain information regarding a users response times. For example, user 305 may have a longer than average response time. Selection controller 315 can adjust a dwell value for each item to take into account a user response time based on data in the user's profile.

In another illustrative embodiment, dwell threshold 355 is based on the average or mean dwell value. In such a case, dwell threshold 355 is a rolling average of mean/average dwell values for a set of items.

In this example, the initial set of items is a homogenous set of items. For example, the initial set of items includes all available television channels but does not include any non-television channel items. However, in another example, the initial set of items is a heterogeneous or non-homogenous set of items. A heterogeneous set of items includes items of different types and different mediums. For example, the initial set of items can include television channels, web pages, music or song selections, radio stations selections, and/or any other combination of items having differing media type content.

In this example, user 305 begins by viewing the items in an initial set of items that includes a full set of all items. For example, if the set of items are television channels, user 305 begins with a complete initial set of all the television channels available for viewing. In another example, user 305 can begin with an initial set of items that does not include the full set of all items available. In other words, user 305 can begin with a subset of items from the initial set of items. In other words, the user can begin the process of the illustrative embodiments with a subset of items that is already a partially pruned list of available content items. For example, if one-hundred (100) channels are available, user 305 may begin with a partially pruned initial set of items that includes only fifty (50) channels out of the one-hundred (100) available channels. This partially pruned list can be a set of pre-selected choices by the user, such as a set of favorite channels.

In the example shown in FIG. 3, a user does not take any affirmative action to select items that are removed from the initial set of items. The initial set of items having one or more items removed is a selected set of items. In other words, the selected set of items is the set of items that includes only those items having a dwell value greater than the dwell threshold. However, in another illustrative embodiment, a user may affirmatively select one or more items for addition to the selected set of items. For example, when a user selects to display an item and the user recognizes the item as an item having content of interest, the user can affirmatively select to include the item in the selected set of items regardless of the items dwell time and/or dwell value.

A user can affirmatively select to include an item in the selected set of items by selecting a graphic control on a display screen, verbally indicating a selection to a voice response system, using a mouse to click on a selection, selecting a control on a remote control or other display device controller, and/or any other known or available method for a user to provide input to selection controller 315 to indicate a selection of an item for inclusion in a selected subset of items. Thus, in this example, the selected set of items can include items having a dwell value greater than the dwell threshold, as well as user-selected items of interest. The user-selected items of interest can include items having a dwell value greater than the dwell threshold, items having a dwell value equal to the dwell threshold, as well as items having a dwell value less than the dwell threshold.

Figure 4:
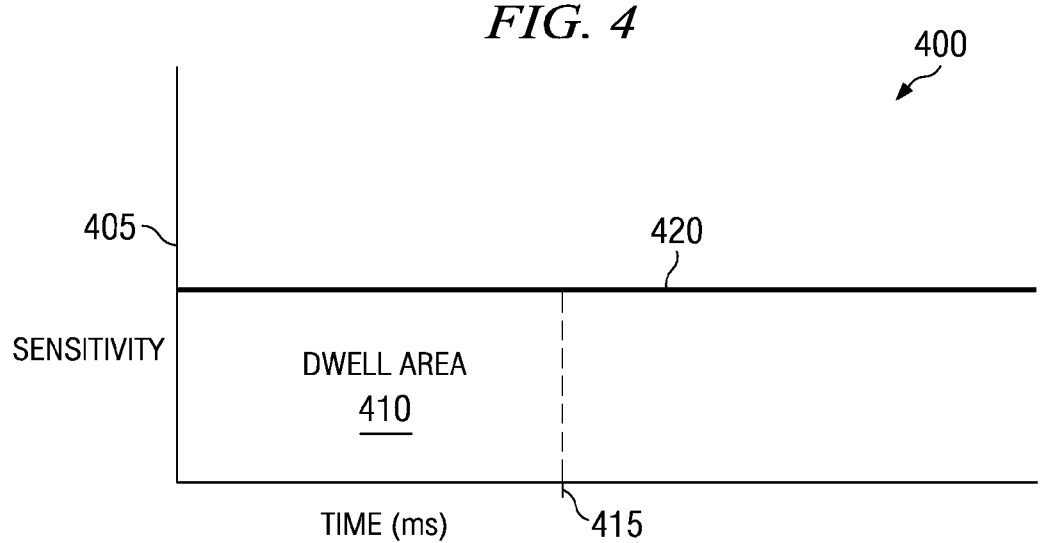
FIG. 4 is a graph diagram illustrating a dwell area of a dwell timing profile in accordance with an illustrative embodiment.

FIG. 4 is a graph diagram illustrating a dwell area of a dwell timing profile in accordance with an illustrative embodiment. Dwell timing profile 400 is a graph illustrating a dwell value for a given item. A selection controller uses dwell timing profile 400 to calculate or identify a dwell value for a given item.

Dwell area 410 is an area beneath the curve plotted based on the timing sensitivity along the y-axis and the dwell time along the x-axis. The timing sensitivity is the relative sensitivity of dwell at a given point in time. The timing sensitivity is obtained from a timing profile for the given item.

Thus, dwell area 410 is calculated by plotting the dwell time across the horizontal x-axis of the graph relative to the sensitivity level for the given item at the y-axis. Dwell area 410 represents an area from a point at which a user begins to dwell on an item 405 to the point when a user ceases dwelling on the item 415. The dwell value for the given item is determined based on the dwell area. In this example, the dwell value for a given item is equal to dwell area 410. In this example, the timing sensitivity indicates that the dwell time measured equally for all items and all content for the items. In other words, the sensitivity is constant and does not vary depending on rendering time, item content, or any other variable, constants, or constraints. Thus, graph line 420 is a straight line.

Figure 5:
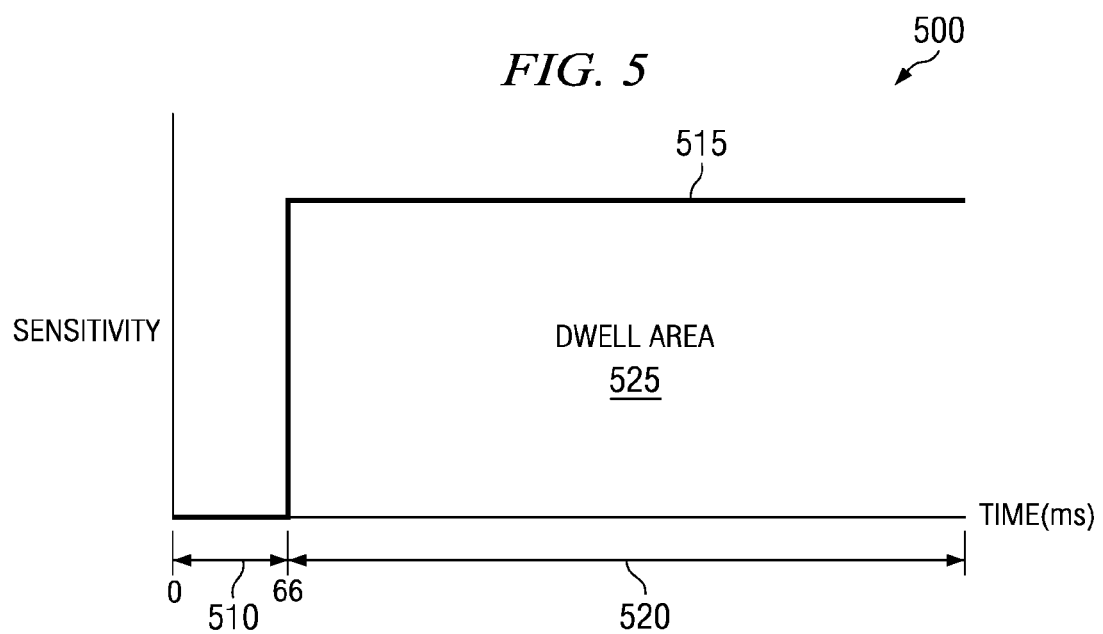
FIG. 5 is a graph diagram illustrating a dwell timing profile when an item content is initially rendered in accordance with an illustrative embodiment.

Referring now to FIG. 5, a graph diagram illustrating a dwell timing profile when an item content is initially rendered is shown in accordance with an illustrative embodiment. In this example, the timing sensitivity along the y-axis indicates that an item content has a render time of sixty-six (66) seconds at section 510. In other words, the content takes sixty-six seconds to draw or display for a user to view. The timing sensitivity data for the given item permits a selection controller to calculate a dwell value for the given item that takes into account the sixty-six milliseconds of render time.

In this example, the selection controller uses the dwell time indicated along the x-axis and the timing sensitivity along the y-axis to plot graph line 515. The section of graph line 515 at section 510 is the render phase for rendering the content associated with the given item. Section 520 is the portion of the dwell time during which a user dwells on, listens to, or views the displayed content after rendering is complete.

Dwell area 525 is the area below graph line 515. Dwell area 525 does not include any area below section 510 at which timing sensitivity is at zero. The selection controller uses dwell area 525 to calculate the dwell value for the given item. In this manner, the selection controller can utilize dwell area 525 to identify a dwell value for the given item that is not based on time for rendering the content for the given item.

Figure 6:
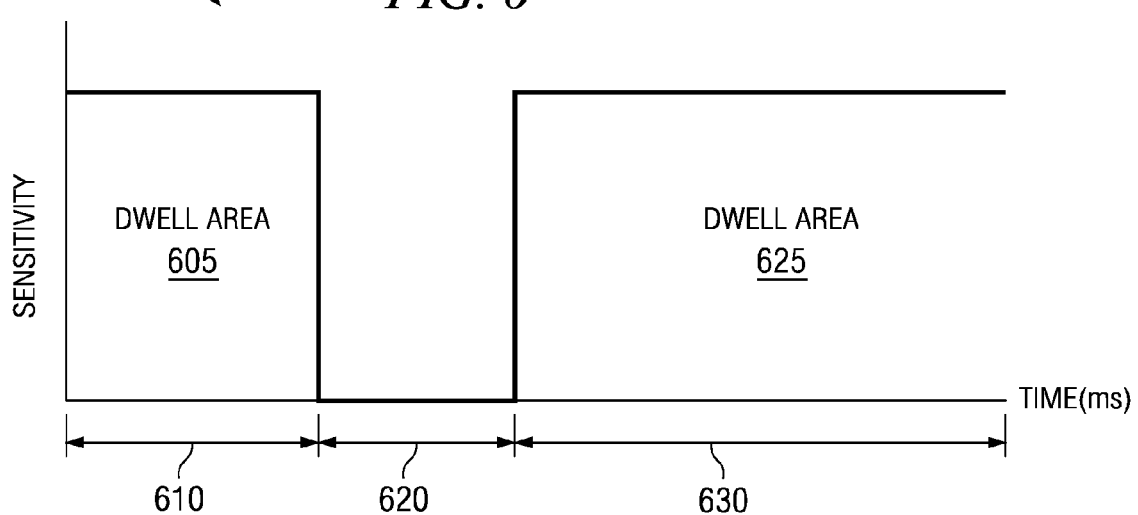
FIG. 6 is a graph diagram illustrating a dwell timing profile when an item content includes non-programming content in accordance with an illustrative embodiment.

FIG. 6 is a graph diagram illustrating a dwell timing profile when item content includes non-programming content in accordance with an illustrative embodiment. In this example, dwell timing profile 600 is a profile of the dwell time for a given item.

The total dwell time for the given item is shown along the x-axis. The timing sensitivity for the given item is shown along the y-axis. The timing sensitivity provides data indicating that program content is displayed during the time interval at section 610, commercial or non-programming content is displayed during the time interval at section 620, and additional program content is displayed during the time interval at section 630. Thus, the total dwell area for the given item shown on this timing profile includes dwell area 605 and dwell area 625. A dwell area does not occur during commercial segment 620 because the sensitivity during the commercial segment is at zero. Dwell area 605 and dwell area 625 can be added cumulatively to provide a total dwell area for the given item.

The selection controller algorithm calculates a dwell value for the given item based on the cumulative dwell area for the given item. Thus, the dwell time for this given item includes the cumulative dwell time occurring at section 610 and 630 but excludes the time during which non-programming content is displayed to the user at section 620.

Figure 7:
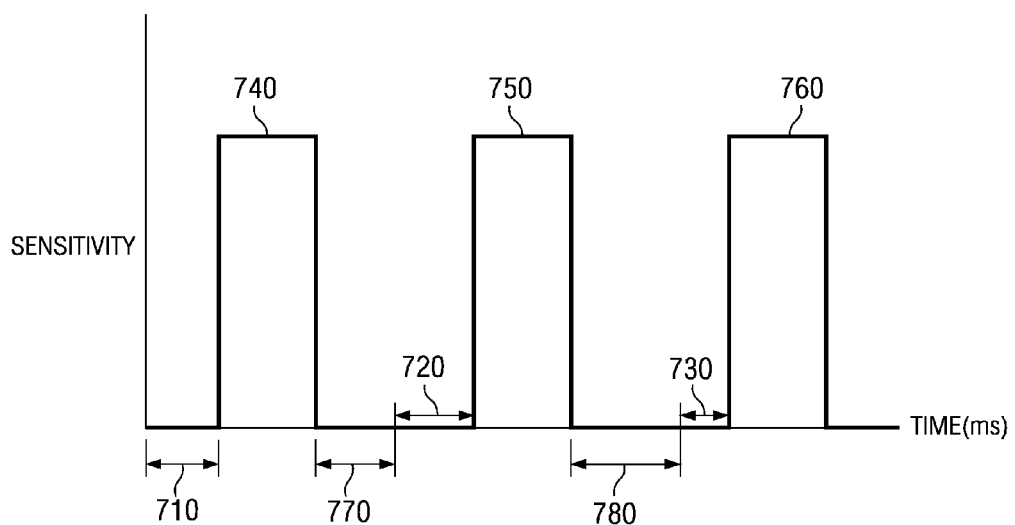
FIG. 7 is a graph diagram illustrating a dwell timing profile when an item content that includes both programming content and non-programming content is rendered in accordance with an illustrative embodiment.

Turning now to FIG. 7, a graph diagram illustrating a dwell timing profile when an item content that includes both programming content and non-programming content is rendered is depicted in accordance with an illustrative embodiment. At sections 710, 720, and 730, a display device is rendering content. During this render phase, the timing sensitivity is at zero. In other words, the timing sensitivity data provided by the timing profile indicates a timing offset to compensate for the amount of time required for a display device to render the content associated with the given item for display to the user.

At sections 740, 750, and 760, a display device is displaying item content to a user. The dwell area occurring at sections 740, 750, and 760 are added to provide a cumulative dwell area for the given item.

When commercial or non-programming content is displayed at sections 770 and 780, the timing sensitivity value is again at zero. In other words, the timing sensitivity data provided by the timing profile for the given item indicates a timing offset to compensate for dwell time occurring during display of commercials, advertisements, or other non-programming content.

The dwell value for the given item is identified based on the cumulative dwell area for the given item. As shown, the cumulative dwell area does not include a dwell area occurring during render time and during non-commercial programming display because the timing sensitivity provides a timing offset during the render phase and non-programming content phase.

Figure 8:
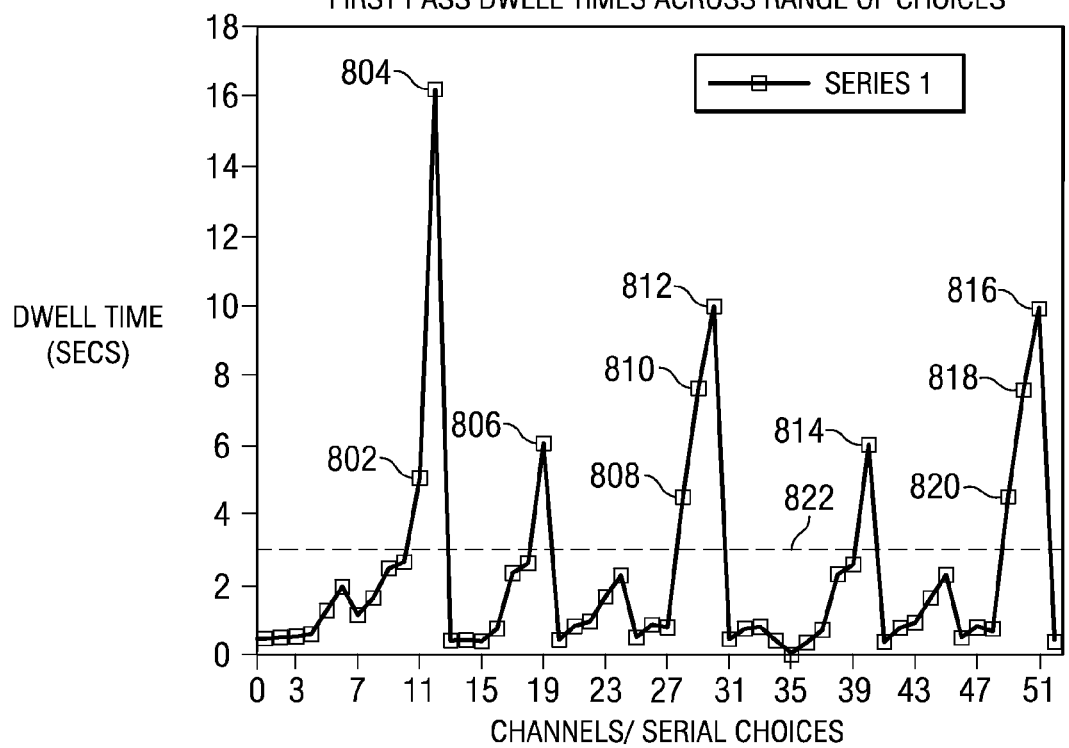
FIG. 8 is a graph diagram illustrating removal of content items with a dwell value that is less than a dwell threshold from a set of content items in accordance with an illustrative embodiment.

FIG. 8 is a graph diagram illustrating removal of content items with a dwell value that is less than a dwell threshold from a set of content items in accordance with an illustrative embodiment. In this example, items 802-820 have a dwell value that is greater than the dwell threshold of three seconds. All the items having a dwell value below the three second dwell threshold at graph line 822 are removed from the selected set of items. Thus, the selected set of items is reduced from fifty-two items in the initial set of content items to only ten items in the selected set of items.

Figure 9:
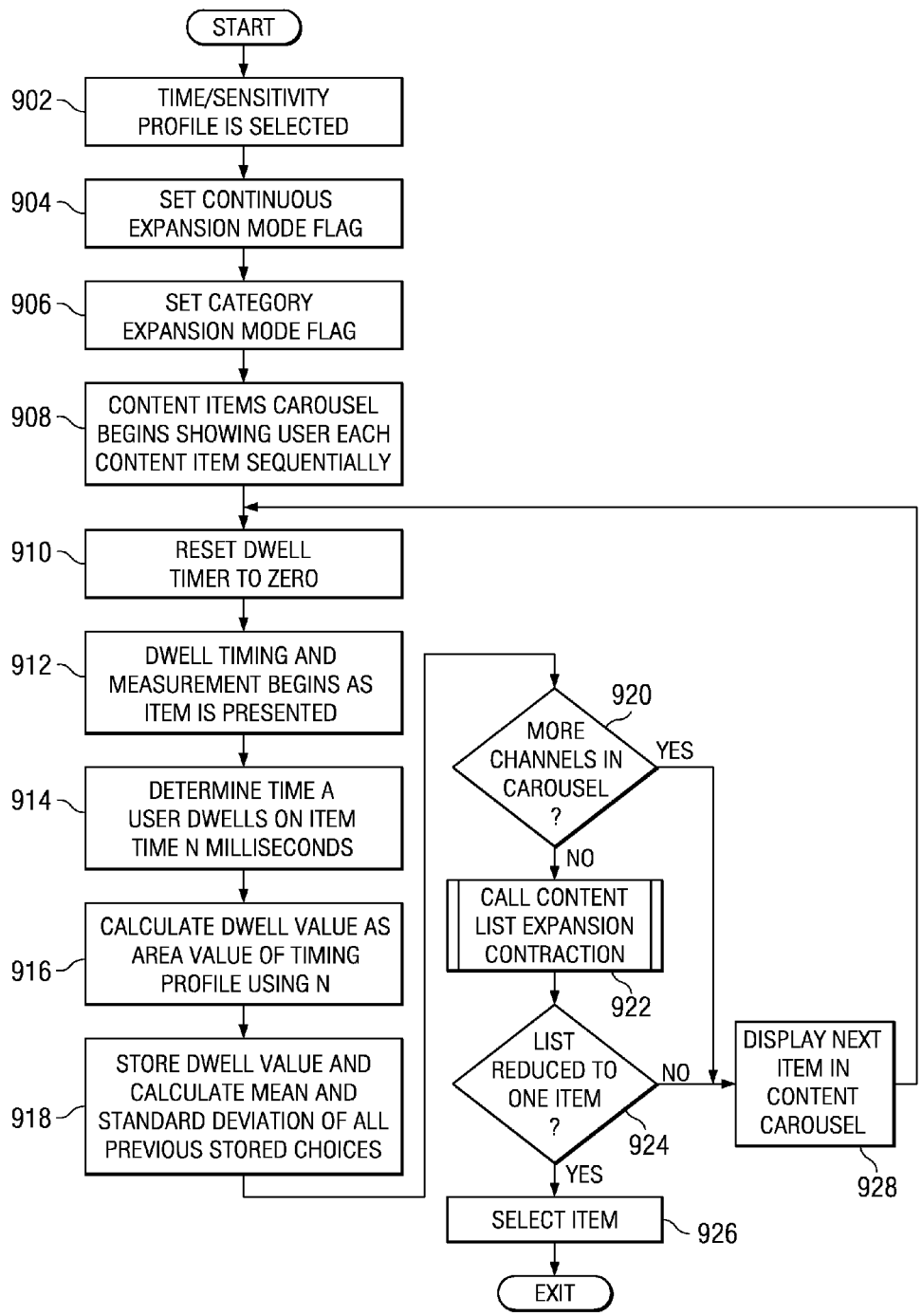
FIG. 9 is a flowchart illustrating a process for determining a dwell value for each item in a set of content items in accordance with an illustrative embodiment.

Referring now to FIG. 9, a flowchart illustrating a process for determining a dwell value for each item in a set of content items is shown in accordance with an illustrative embodiment. In this illustrative example shown in FIG. 9, the process is performed by a software component for managing a set of items, such as selection controller 315 of FIG. 3.

The process begins by selecting a timing profile for a given item (step 902). The process sets a continuous expansion mode flag (step 904) based on input received from a user. The process sets a category expansion mode flag (step 906) based on input received from a user. The process begins showing a user each content item from a content items carousel in a sequential order (step 908). The items in the content carousel is an initial set of content items for display to the user.

A content items carousel refers to a round-robin approach to displaying items in a rotating or circular type order. Each item in the set of items is displayed to a user in its turn. For example, if a set includes three items, after a first item is displayed, a second item is displayed, then the third item is displayed. If we continue on, in the next iteration, the first item is displayed again, then the second item, and so forth.

The process resets the dwell timer counter to zero (step 910). The process begins measuring dwell time as the given item is presented (step 912). The process determines an amount of time the user dwells on the given item in milliseconds (step 914). The process calculates a dwell value for the given item as an area value of the timing profile using the dwell time in milliseconds (step 916). The process stores the dwell value and calculates the mean dwell value and standard deviation from the mean dwell value (step 918).

The process makes a determination as to whether more unprocessed items remain in the carousel (step 920). If more items do not remain in the carousel, the process calls a content list expansion/contraction function (step 922). In other words, after displaying a content item and obtaining a dwell value for the item, the process calls a content list expansion/contraction function to determine whether to expand or contract the list of items. An exemplary illustration of a content list expansion/contraction function is shown in FIG. 10.

The process then makes a determination as to whether the list of selected items is reduced to one item (step 924). If the list of selected items is reduced to one item, the process selects the remaining item (step 926) for display to the user and the process terminates thereafter.

If the list of selected items is not reduced to one item at step 924 or more unprocessed items remain in the carousel at step 920, the process displays the next item in the content carousel (step 928). The process continues executing the loop shown in steps 910-920 until all the items in the carousel have been processed. In other words, the process is a loop that displays each content item in the carousel list, monitors a user's dwell time for each item, and calculates a dwell value for each item. The process continues executing steps 928-920 until the list of selected items has been reduced to a single item with the process terminating thereafter.

Figure 10:
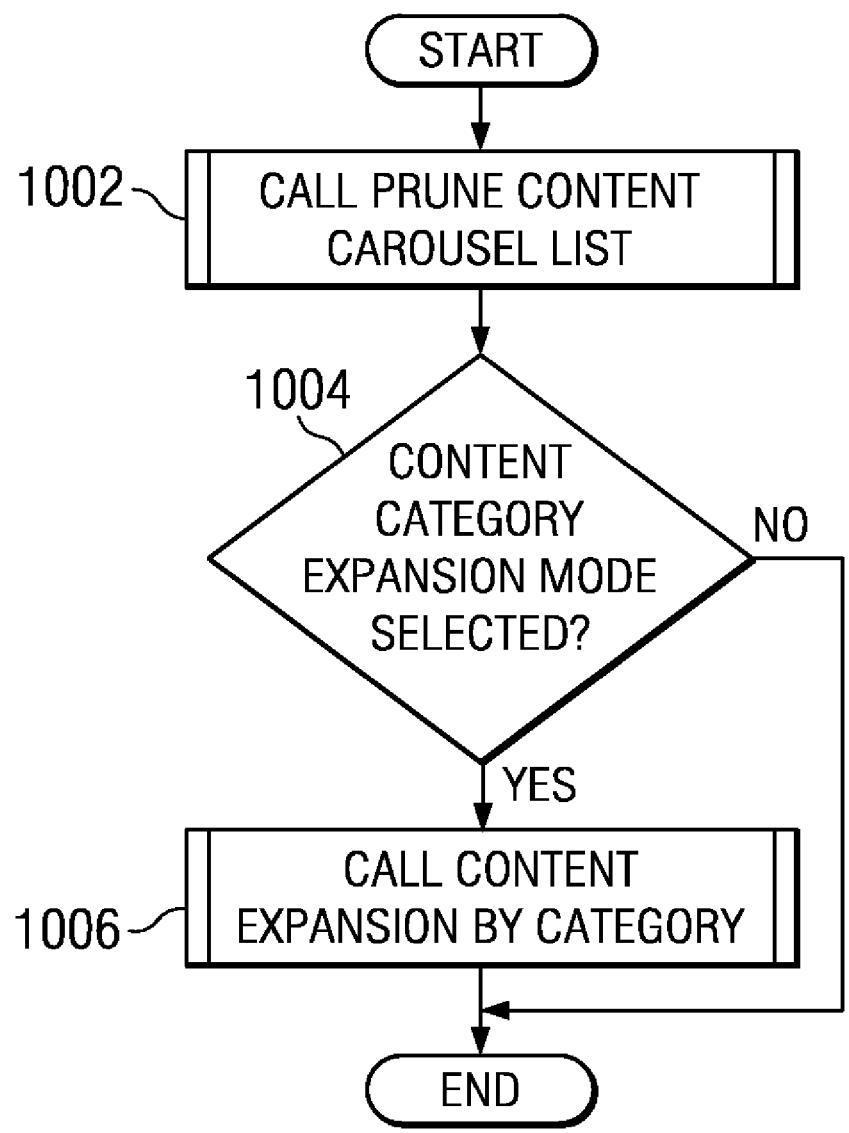
FIG. 10 is a flowchart illustrating a process for content item list expansion and/or contraction in accordance with an illustrative embodiment.

FIG. 10 is a flowchart illustrating a process for content item list expansion and/or contraction in accordance with an illustrative embodiment. In this illustrative example shown in FIG. 10, the process is performed by a software component for managing a set of items, such as selection controller 315 of FIG. 3.

Figure 13:
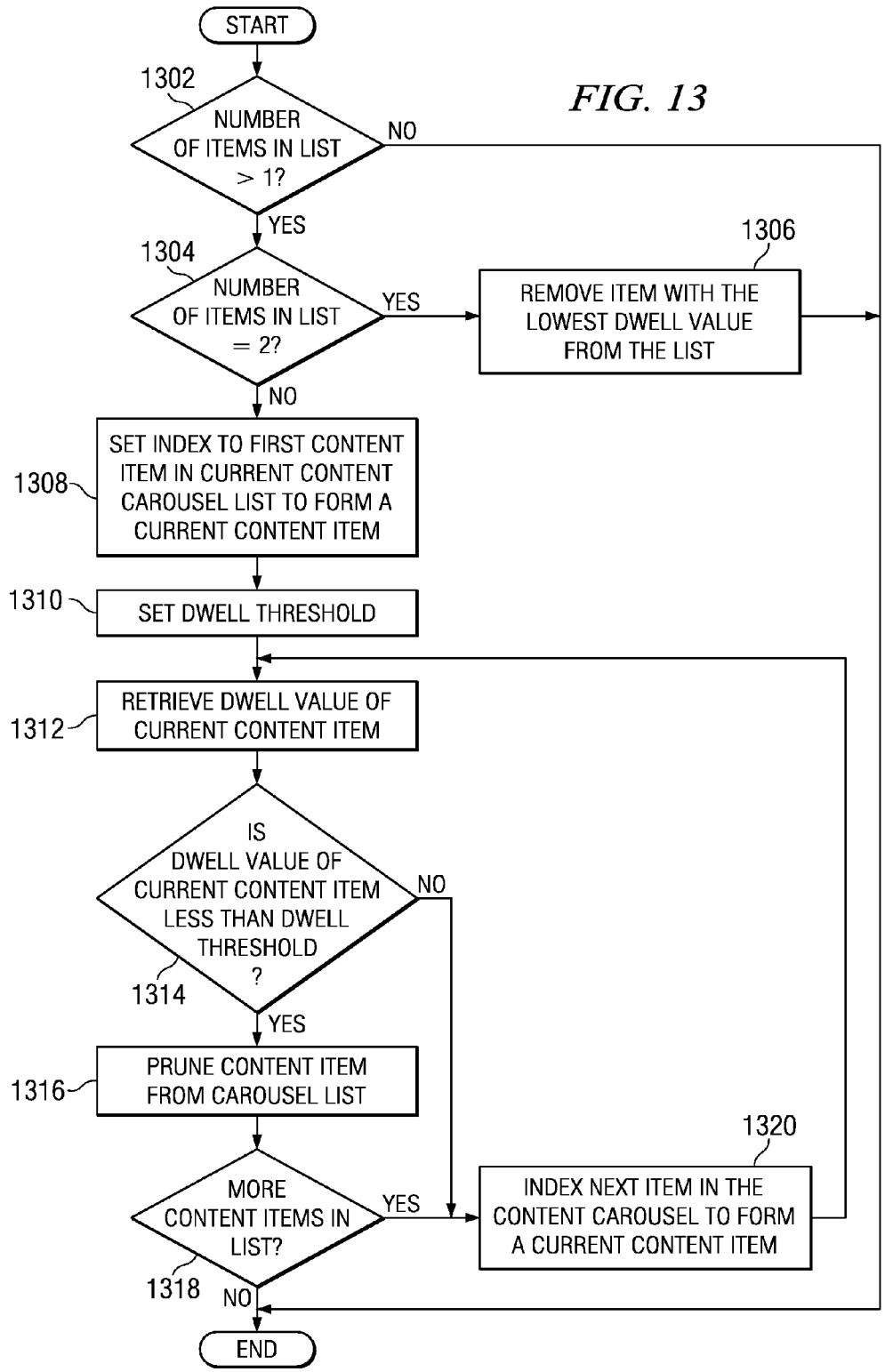
FIG. 13 is a flowchart illustrating a process for removing content items from a set of content items based on item dwell time in accordance with an illustrative embodiment.

The process begins by calling a prune content carousel list function (step 1002) to remove items from the carousel list that have a dwell value less than the dwell threshold. In other words, the process calls a prune function to remove items from the content list with low dwell values that fall below the dwell threshold. An example of a prune content carousel list function is shown in FIG. 13.

The process makes a determination as to whether the content category expansion mode is selected (step 1004). The process only performs a content expansion if the content category expansion flag is set to allow content expansion.

Figure 12:
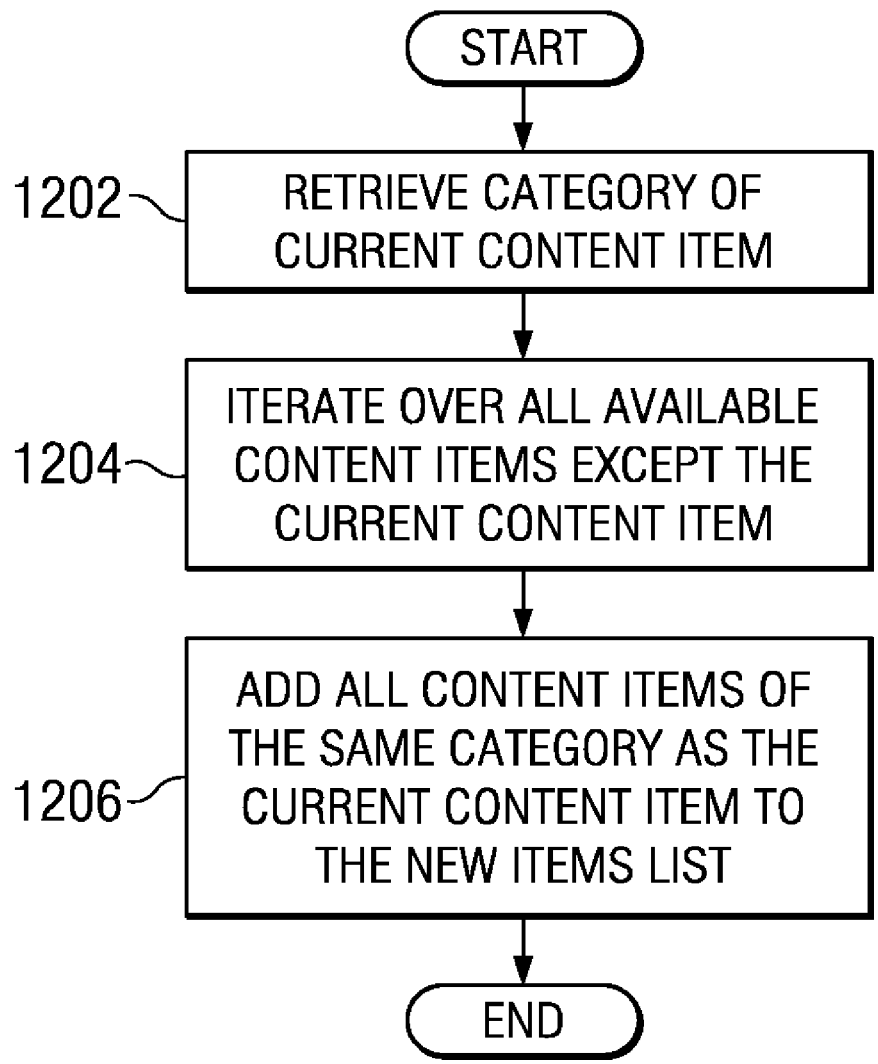
FIG. 12 is a flowchart illustrating a process for expanding a set of content items by category in accordance with an illustrative embodiment.

If the content category expansion mode is selected, the process calls a content expansion by category function (step 1006) to add items to the carousel list based on category identifiers for the items with the process terminating thereafter. An exemplary illustration of a content expansion by category function is illustrated in FIG. 12.

In other words, the process will add additional content channels by category when the dwell value for a given item is above the category threshold. However, if the content category expansion mode flag is set to false at step 1004, no attempt to expand the selected set of items will be attempted during any iteration of the set of items and the process terminates thereafter.

Figure 11:
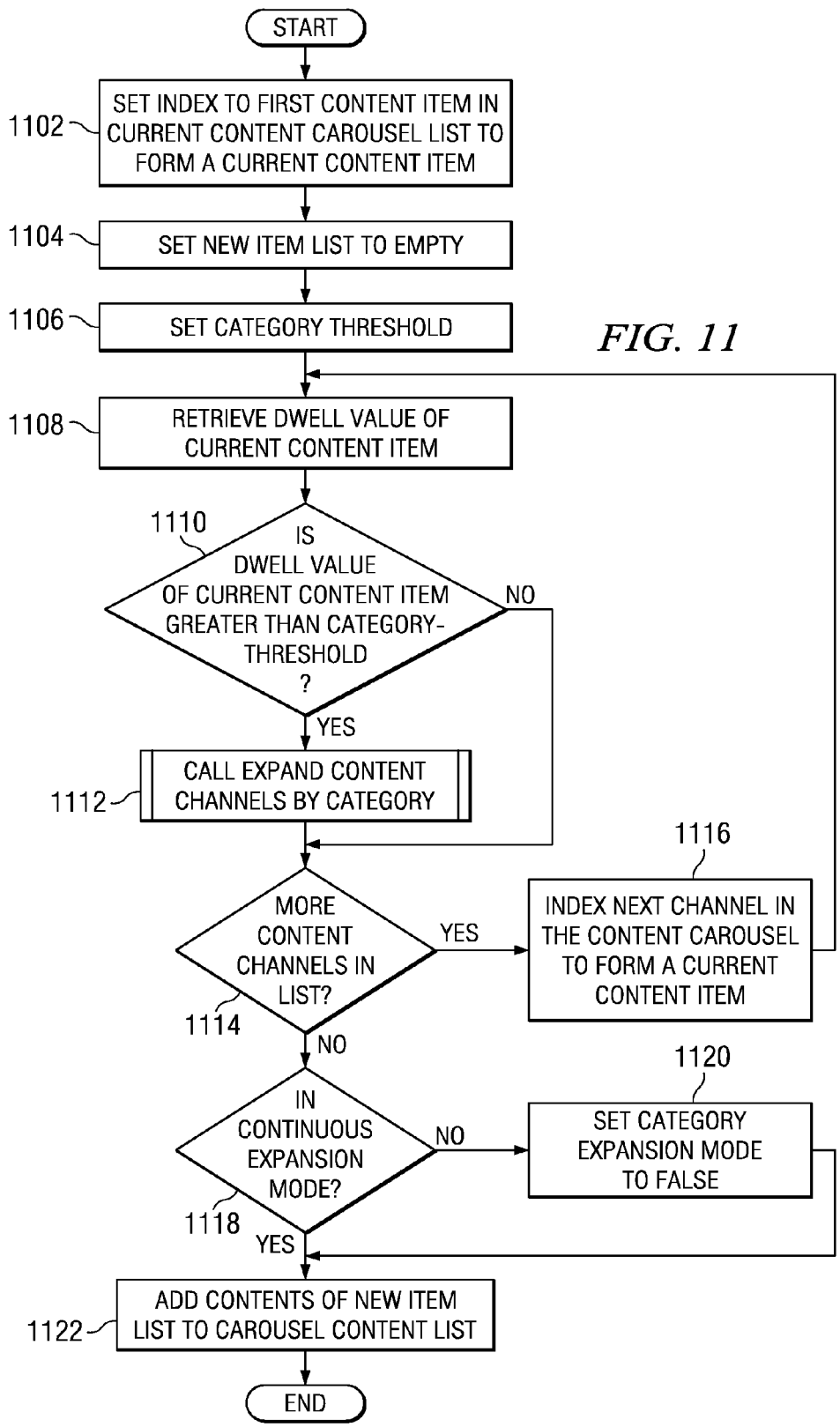
FIG. 11 is a flowchart illustrating a process for determining whether to expand a set of content items in accordance with an illustrative embodiment.

FIG. 11 is a flowchart illustrating a process for determining whether to expand a set of content items in accordance with an illustrative embodiment. In this illustrative example shown in FIG. 11, the process is performed by a software component for managing a set of items, such as selection controller 315 of FIG. 3.

The process begins by setting an index to a first content item in a current content carousel list to form a current content item (step 1102). The process sets a new item list to empty (step 1104). The new item list is a list for adding new items to the current carousel list.

The process sets a category threshold (step 1106). The process retrieves a dwell value for the current content item (step 1108). The process makes a determination as to whether the dwell value for the current content item is greater than the category threshold (step 1110). If the dwell value is greater than the category threshold, the process calls a content expansion by category function (step 1112). The content expansion by category function adds additional items to the new item list. An example of a content expansion by category function is illustrated in FIG. 12.

The process makes a determination as to whether more content channels remain unprocessed in the carousel list (step 1114). Responsive to a determination that more items remain unprocessed, the process sets the index to the next item in the content carousel to form a current content item (step 1116). The process continues iteratively until all items in the carousel list are processed.

The process then makes a determination as to whether a continuous expansion mode is set to true (step 1118). If the continuous expansion mode flag is set to false, the process sets the category expansion mode flag to false (step 1120). In other words, if the continuous expansion mode flag is set to false, the process will only attempt to expand the carousel list of items during this first iteration. The process will not attempt to expand the carousel list during subsequent iterations of the process shown in FIG. 11. Therefore, the category expansion mode is set to false to prevent the process from calling the category expansion mode function illustrated in FIG. 12 during subsequent iterations of the process.

The process adds the contents of the new item list to the carousel content list (step 1122) with the process terminating thereafter.

Turning now to FIG. 12, a flowchart illustrating a process for expanding a set of content items by category in accordance with an illustrative embodiment. In this illustrative example shown in FIG. 12, the process is performed by a software component for expanding a set of items by category, such as selection controller 315 of FIG. 3.

The process begins by retrieving a category for the current content item (step 1202). The process iterates over all available content items in the initial set of content items with the exception of the current content items to identify items with the same category as the current content items (step 1204). The process adds all identified content items having the same category as the current content item to the new item list (step 1206) with the process terminating thereafter. The items in the new item list are added to the current carousel list at step 1122 in FIG. 11.

FIG. 13 is a flowchart illustrating a process for removing content items from a set of content items based on item dwell time in accordance with an illustrative embodiment. In this illustrative example shown in FIG. 13, the process is performed by a software component for removing items from a set of items based on a dwell time, such as selection controller 315 of FIG. 3.

The process begins by making a determination as to whether the number of items in the current carousel list is greater than one (step 1302). If the number of items is not greater than one, the process terminates thereafter.

If the number of items in the carousel list is greater than one, the process makes a determination as to whether the number of items in the list is equal to two (step 1304). If the number of items in the carousel list is equal to two, the process prunes or removes the item with the lowest dwell value from the carousel list (step 1306) with the process terminating thereafter.

If the number of items in the carousel list is not equal to two, the process sets an index to the first content item in the current content carousel list to form a current content item (step 1308). The process sets a dwell threshold (step 1310). The process retrieves a dwell value for the current content item (step 1312).

The process makes a determination as to whether the dwell value is less than the dwell threshold (step 1314). If the dwell value is less than the dwell threshold, the process prunes or removes the content item from the carousel list (step 1316).

The process makes a determination as to whether more unprocessed content items remain in the carousel list (step 1318). If more unprocessed items remain in the carousel list, the process sets the index to the next item in the content carousel to become the current content item (step 1320). The process continues iteratively until no more unprocessed items remain in the carousel list, with the process terminating thereafter.

Thus, the illustrative embodiments provide a computer implemented method, apparatus, and computer program product for managing a serially presented set of content items. As items are presented to a user, the process monitors and stores the dwell time that a user spends on each item.

The process calculates a dwell value for each item. The dwell value is calculated based on the dwell time for the item and a timing profile for the item. The dwell value is an indicator of a user's interest in each item. Items having a dwell value below a threshold dwell value are removed from the set of items. Thus, items that are of less interest to the user are automatically removed without any action by the user other than viewing each item in the set of serially presented items. In this manner, a large set of content item choices can be rapidly and automatically reduced to a smaller and more manageable selected set of items for the user.

In addition, the process can add content items to the selected set of items in response to a user showing interest in a new category of items and/or in response to the expiration of a given amount of time. Therefore, the selected set of items can be expanded and contracted based on the user's interest in the content of each item as measured by dwell time. Thus, the illustrative embodiments provide a computer implemented method, apparatus, and computer program product for managing a serially presented set of content items in order to identify and select items of interest to a user.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a set of serially presented plurality of content items, the computer implemented method comprising:
    responsive to a user selection of a given item from a carousel list of the plurality of content items that are serially presented, displaying a content for the given item on a display device for an amount of time based on the user selection;
    identifying a dwell value for the given item based on a dwell time for the given item and a timing profile, wherein the dwell time is the amount of time the content for the given item is displayed on the display device;
    responsive to a determination that the dwell value for the given item is less than a dwell threshold, removing the given item from the carousel list of the plurality of content items that are serially presented.

2. The computer implemented method of claim 1 wherein the given item is a television channel.

3. The computer implemented method of claim 1 wherein the given item is a radio station.

4. The computer implemented method of claim 1 wherein the calculating step further comprises:
    selecting the timing profile for the given item, wherein the timing profile includes a timing offset and an amount of time required to render the content of the given time, wherein the content is a web page.

5. The computer implemented method of claim 1 wherein the timing profile includes an amount of time for displaying non-programming content.

6. The computer implemented method of claim 1 further comprising:
    measuring a dwell time for every item in the plurality of content items displayed to the user;
    calculating a dwell value for every item in the plurality of items based on the dwell time for each item and the timing profile for each item; and
    removing each item with a dwell value that is less than the dwell threshold from the plurality of content items to form a selected set of items.

7. The computer implemented method of claim 6 further comprising:
    storing the dwell value for each item in the plurality of items in a data storage device to form a set of dwell values; and
    calculating a mean dwell value for the set of dwell values and a standard deviation from the mean dwell value.

8. The computer implemented method of claim 1 wherein a value for the dwell threshold is the standard deviation from a mean dwell value.

9. The computer implemented method of claim 1 wherein the dwell threshold is a user defined threshold value.

10. The computer implemented method of claim 1 wherein the dwell threshold is a predefined default threshold value.

11. The computer implemented method of claim 1 further comprising:
    responsive to determining that the dwell value for a given item is greater than a category threshold, retrieving a category identifier for the given item;
    identifying all items in the plurality of content items with the same category identifier as the given item to form a set of new content items; and
    adding the set of new content items to a selected set of items.

12. The computer implemented method of claim 11 wherein the category threshold is a user defined threshold value.

13. The computer implemented method of claim 11 wherein the category threshold is a predefined default threshold value.

14. The computer implemented method of claim 11 wherein the category threshold is a dynamically calculated based on a mean dwell value for the plurality of content items and a standard deviation from the mean dwell value.

15. The computer implemented method of claim 1 further comprising:
    automatically re-adding all removed items to the carousel list after a predetermined period of time has elapsed.

16. An apparatus for managing a set of serially presented plurality of content items, comprising:
    a display device;
    a computing device, the computing device comprising: a controller;
    a storage device connected to a bus, wherein the storage device contains a computer usable program product; and
    a processor, wherein the processor unit executes the computer usable program code, responsive to a user selection of a given item from a list of the plurality of content items that are serially presented, to display a content for the given item on a display device for an amount of time based on a user input, wherein the given item is one of a television channel and a radio station; identify a dwell value for the given item based on a dwell time for the given item and a timing profile, wherein the dwell time is the amount of time the content for the given item is displayed on the display device; remove the given item from the list of the plurality of content items that are serially presented in response to a determination that the dwell value for the item is less than a dwell threshold; responsive to determining that the dwell value for a given item is greater than a category threshold, retrieve a category identifier for the given item, wherein the category threshold is dynamically calculated based on a mean dwell value for the plurality of content items and a standard deviation from the mean dwell value; identify all items in the plurality of content items with the same category identifier as the given item to form a set of new content items; and add the set of new content items to the list.

17. A computer program product comprising:
a computer usable storage medium including computer usable program code stored thereon for managing a set serially presented plurality of content items, said computer usable program code comprising:
computer usable program code, responsive to a user selection of a given item from a list of the plurality of content items that are serially presented, for displaying a content for the given item on a display device for an amount of time based on the user input, wherein the given item is one of a television channel and a radio station
computer usable program code for identifying a dwell value for the given item based on a dwell time for the given item and a timing profile, wherein the dwell time is the amount of time the content for the given item is displayed on the display device;
computer usable program code for removing the given item from the list of the plurality of content items that are serially presented in response to a determination that the dwell value for the item is less than a dwell threshold;
computer usable program code for retrieving a category identifier for the given item in response to determining that the dwell value for a given item is greater than the category threshold;
computer usable program code for identifying all items in the plurality of content items with the same category identifier as the given item to form a set of new content items; and
computer usable program code for adding the set of new content items to the list.

18. A system for managing a set of serially presented items, the system comprising:
a display device for displaying a content for a given item for an amount of time based on user input in response to a user selection of a given item;
a timer for measuring an amount of time the content for the given item is displayed on the display device to form a dwell time; and
a selection controller for identifying a dwell value for the given item based on a dwell time for the given item and a timing profile, wherein the selection controller removes the item from a carousel list of a plurality of content items displayed on the display device in response to a determination that the dwell value for the item is less than a dwell threshold.

* * * * *